United States Patent [19]

Toeppen

[11] 4,455,745
[45] Jun. 26, 1984

[54] METHOD AND APPARATUS FOR TRIMMING SHIELDED CABLE

[75] Inventor: Thurston H. Toeppen, Poughkeepsie, N.Y.

[73] Assignee: AMP Incorporated, Harrisburg, Pa.

[21] Appl. No.: 385,427

[22] Filed: Jun. 7, 1982

[51] Int. Cl.³ .................. H02G 1/12; B26D 3/00; B21F 13/00
[52] U.S. Cl. .................. 30/90.6; 81/9.51; 83/861; 30/90.1
[58] Field of Search ............. 81/9.5, 9.51; 7/107; 30/90.1, 90.2, 90.4, 90.6–90.9, 92.5; 83/614, 564, 861, 143, 56

[56] References Cited

U.S. PATENT DOCUMENTS

| | | | |
|---|---|---|---|
| 2,313,525 | 3/1943 | Edelman | 83/143 X |
| 3,304,605 | 2/1967 | Stark | 30/90.1 |
| 3,612,743 | 10/1971 | Angele et al. | |
| 3,757,029 | 9/1973 | Marshall | |
| 3,774,478 | 11/1973 | Carpenter et al. | 81/9.51 |
| 3,832,767 | 9/1974 | Petree | 81/9.51 X |
| 4,120,217 | 10/1978 | Rodd et al. | 81/9.51 |
| 4,169,646 | 10/1979 | Stape et al. | |
| 4,188,702 | 2/1980 | Herbert | 81/9.51 X |
| 4,189,799 | 2/1980 | Litehizer | 7/107 |
| 4,231,275 | 11/1980 | Onishi | 83/614 X |
| 4,267,757 | 5/1981 | Frantz | 83/564 X |

Primary Examiner—Frederick R. Schmidt
Assistant Examiner—Debra S. Meislin
Attorney, Agent, or Firm—Russell J. Egan

[57] ABSTRACT

A method and device for selectively removing the outer insulating jacket from a shielded multi-conductor cable without damaging either the shielding or the conductors. A portion of a shielded cable to be terminated is positioned in the device which secures it while cutting the jacket transversely about its entire periphery but only partially through its depth. After one or more transverse cuts are made, the jacket is cut longitudinally between the transverse cuts and the severed portion peeled away to expose the conductive shield.

10 Claims, 6 Drawing Figures

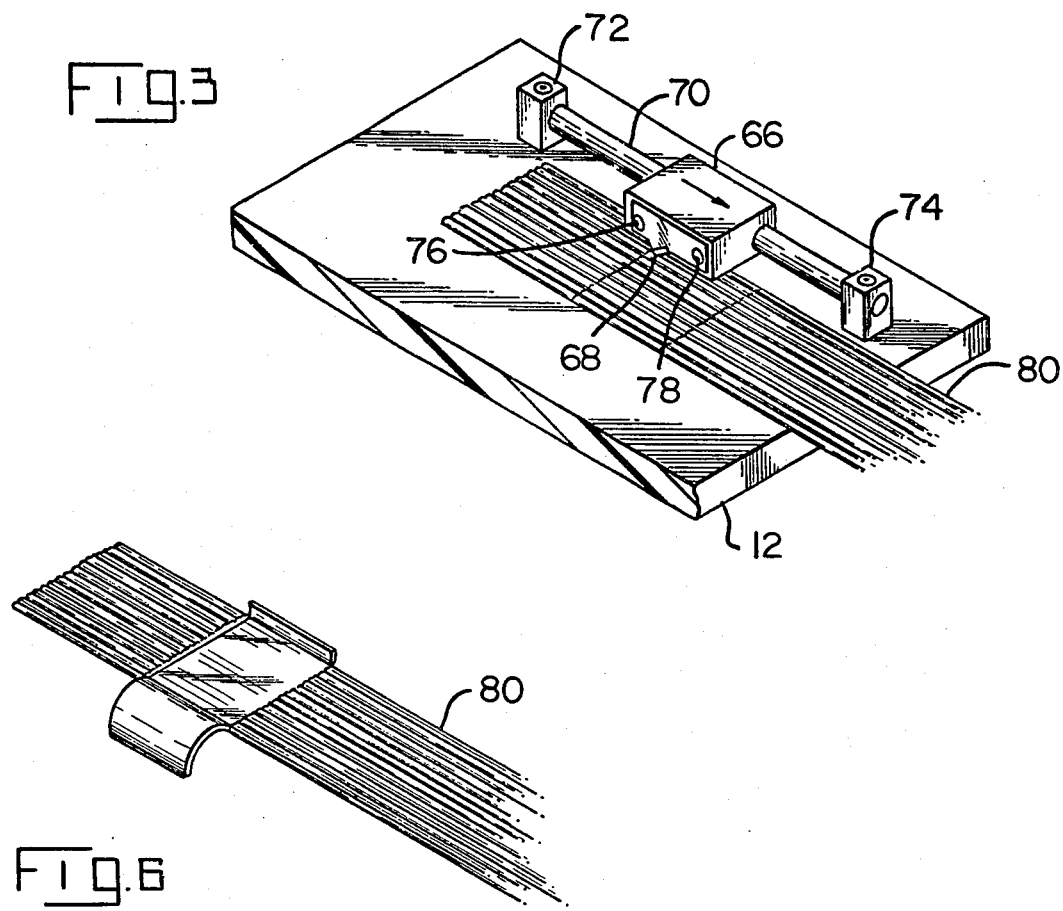
Fig.3
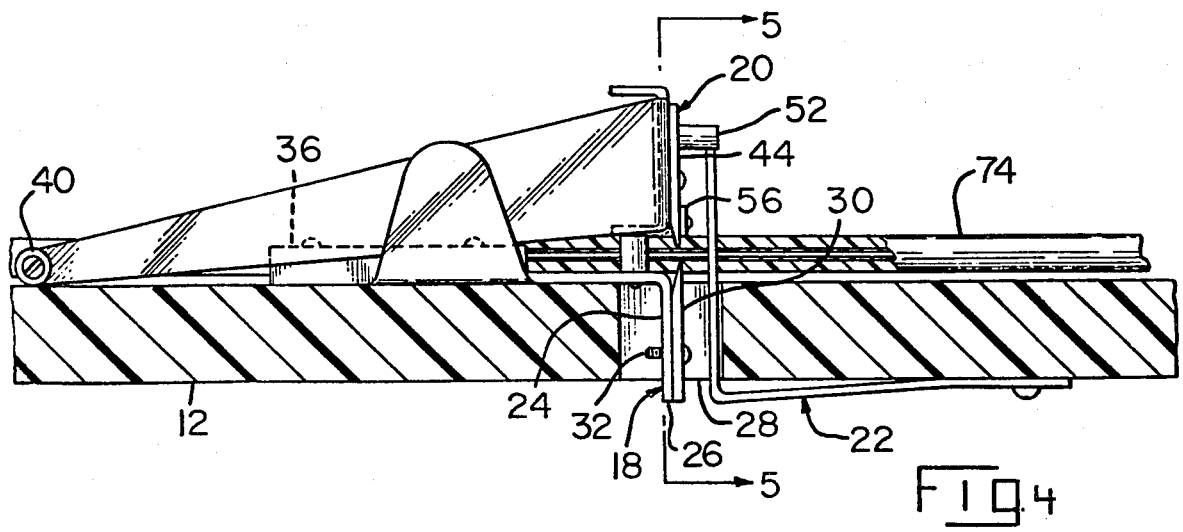
Fig.6
Fig.4
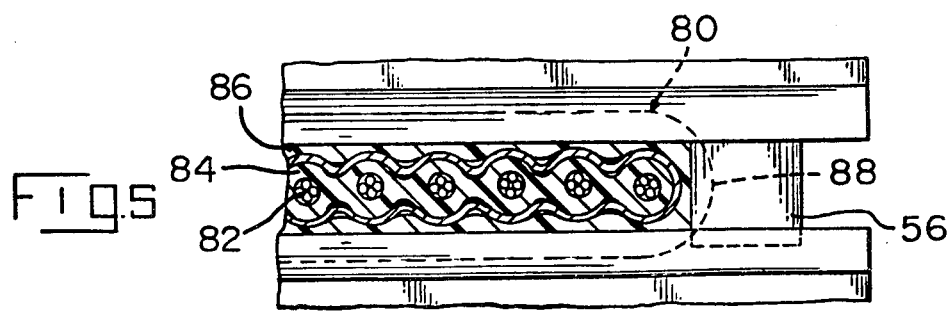
Fig.5

METHOD AND APPARATUS FOR TRIMMING SHIELDED CABLE

The present invention relates to a method and apparatus for preparing shielded cable for termination, and in particular, to a method and apparatus which will remove only the outer insulation layer without adversely affecting the shielding layer or conductors.

The increased requirement for use of shielded cabling in all types of electronic devices has caused a substantial increase in the problems associated with making the necessary terminations since shielded cable is, by its very nature, much more difficult to handle than either individual wires or normal unshielded cable. For the purposes of this application, shielded cable will be defined as a cable having an inner core composed of a plurality of individual conductors secured in a fixed parallel spaced apart flat array in a first insulation housing, the array being surrounded by a conductive shielding layer, and the assembly of the array and shielding being enclosed in an outer jacket of insulative material. An example of such cable may be found in U.S. Pat. No. 3,757,029. In order to terminate this cable it is first necessary to remove a portion of the outer jacket and the shielding so as to provide access to the array of conductors. The problems associated with terminating shielded cable where the outer jacket of insulation is extruded so as to bond or adhere tightly to the shielding and cable conductors are different than those involved in the present invention. This latter type of cable is disclosed in U.S. Pat. No. 3,612,743 and a proposed solution for terminating such molded cable is disclosed in U.S. Pat. No. 4,169,646.

Heretofore, it has been the practice to prepare shielded multi-conductor cable for termination by utilizing a knife or other sharp instrument to cut through the outer jacketing to expose the shielding layer. It is not always possible to control the depth of the knife cut and frequently the shielding and even the conductors themselves may be cut and/or damaged during this operation. The present invention intends to overcome all these aforementioned difficulties by providing a method and apparatus which will readily and accurately prepare a shielded cable for termination.

The present invention, therefore, concerns a device which receives a portion of a shielded cable to be terminated, entraps the cable while cutting the outer insulating jacket only partially through its depth and about its entire periphery by a first cutting assembly. The cable is then shifted and the jacket cut again as is necessary. The device has a second cutting assembly for making a cut partially through the depth of the outer jacketing extending longitudinally of the cable to intersect one or more of the transverse cuts. The outer jacket of the thus prepared cable can be grasped and removed from the cable to expose the undamaged shielding layer.

An embodiment of the invention will now be described by way of illustrative example with reference to the accompanying drawings in which:

FIG. 3 is a fragmentary perspective view of the device of FIG. 1 showing the second cutter assembly positioned to make a longitudinal cut in the outer jacket;

FIG. 4 is a section taken along line 4—4 of FIG. 2; and

FIG. 5 is a section taken along line 5—5 of FIG. 4.

FIG. 6 is a perspective view of the cable as prepared by the subject apparatus with the outer jacket partially stripped therefrom.

Figure 1:
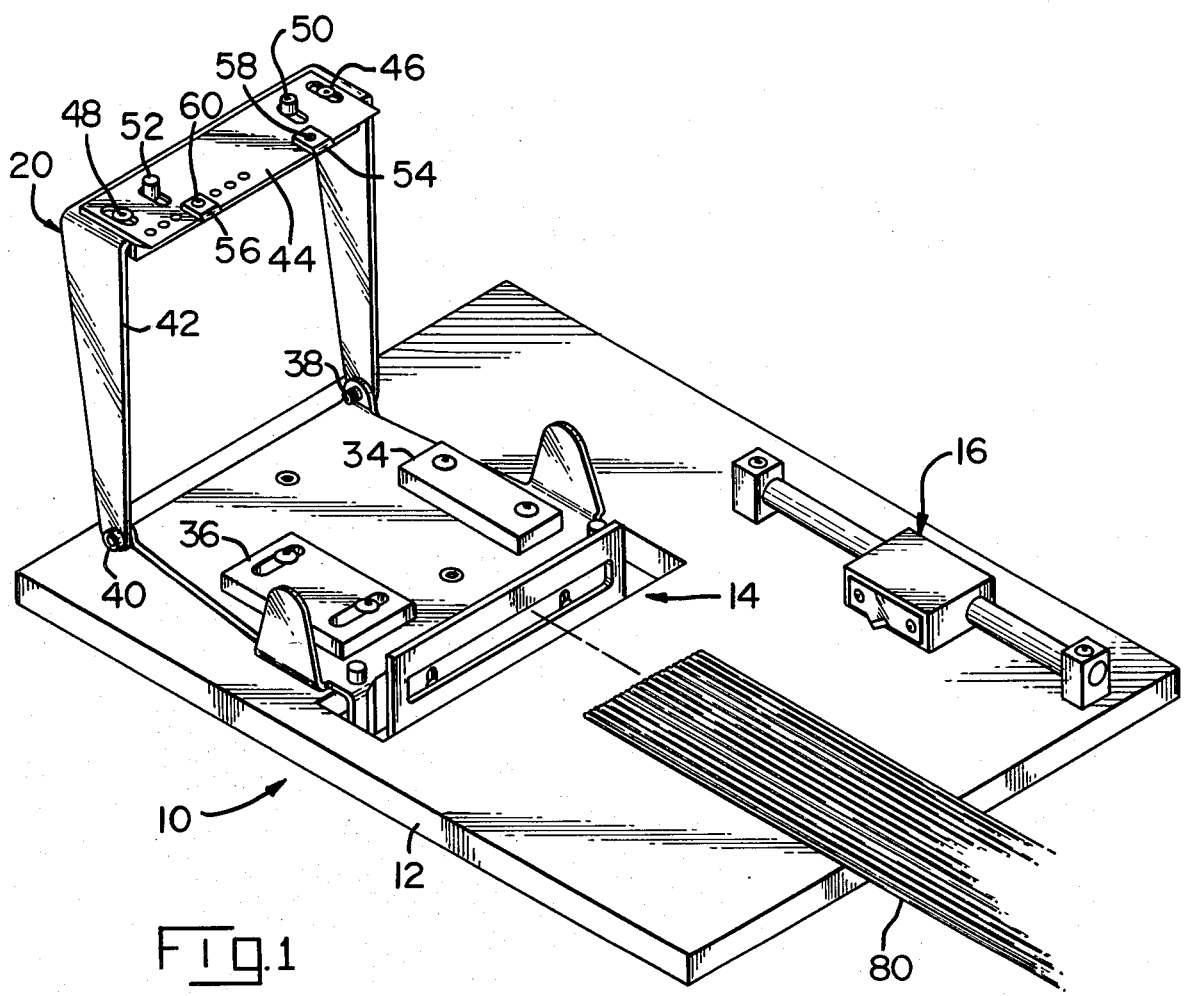
FIG. 1 is a perspective view of a device, incorporating the principles of the present invention, positioned to receive a shielded cable therein.
Figure 2:
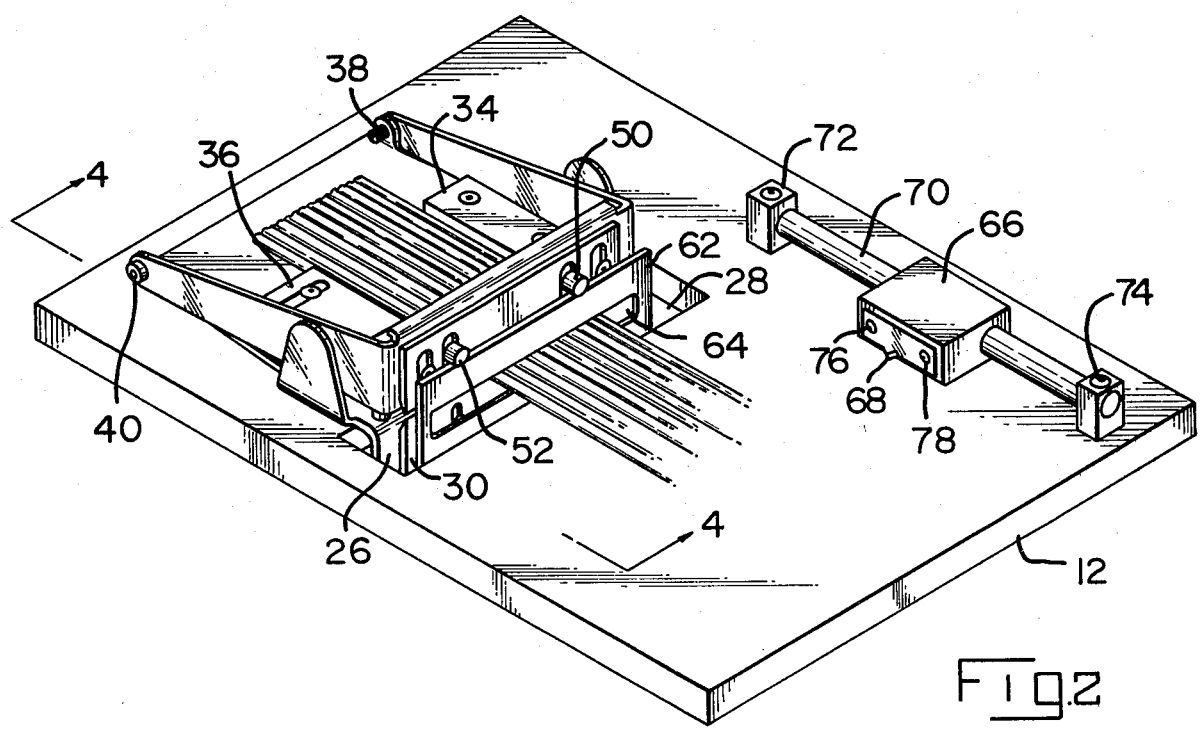
FIG. 2 is a perspective view of the device of FIG. 1 engaging and transversely severing the outer jacket of a shielded cable.

An illustrative embodiment of a cable trimming device 10 incorporating the principles of the present invention is shown mounted on a base 12 and includes a first transverse cutter assembly 14 and a second longitudinal cutter assembly 16.

The first transverse cutter assembly 14 includes a lower cutter portion 18, an upper cutter portion 20, and a cable stripper 22. The lower cutter portion 18 is mounted on the base 12 and includes a frame 24 fixedly mounted on the base 12 with a flange 26 thereof extending through a slot 28 in the base 12. The flange 26 has a lower cutting blade 30 adjustably mounted thereon by screws 32 to fixedly extend slightly above the surface of the frame 24 a distance sufficient to penetrate into the outer jacket of the cable, as will be described later. The frame 24 also includes a pair of side guide members 34, 36 at least one of which is adjustable for the width of the cable. The upper cutter portion 20 is pivotably mounted at the rear of the frame 24 by pivots 38, 40. The upper cutter portion 20 includes a substantially U-shaped frame 42 having an upper cutting blade 44 adjustably mounted thereon by screws 46, 48 to be parallel to the lower cutting blade 30 for controlled penetration of the cable jacket. The upper frame also includes a pair of spaced stops 50, 52 and a pair of edge cutting blades 54, 56 at least one of which is adjustable for the cable width. Blades 54, 56 are mounted by screws 58, 60 and would be positioned so that both are slightly inwardly of the respective side guide members 34, 36. The cutting blades 30, 44, 54, 56 all have single bevel cutting edges. The bevels for blades 30 and 44 are directed to the rear and the bevels for blades 54, 56 are directed to the front so that all blades will cut on substantially the same line. The blades 30, 44, 54, and 56 are all adjustably mounted so that they can be set to penetrate nearly through the outer jacket of the cable.

The cable stripper 22 is mounted from the bottom of the base with a portion 62 extending through the slot 28 in parallel spaced relation to the blades 30, 44 and has an elongated slot 64 therein which normally extends above the surface of the base 12.

The longitudinal cutter assembly 16 includes a housing 66 carrying a blade 68 with the housing mounted for limited movement on rail 70 between stops 72, 74. The blade 68 is adjustable on the housing by screws 76, 78.

The cable 80, as previously mentioned, is a shielded cable having a plurality of parallel spaced conductors 82 mounted in fixed spaced relation in a first insulative layer 84 which in turn is surrounded by a conductive shielding layer 86, which can be either in a form of a mesh or web of metal or other conductive material, with the entire assembly enclosed within an outer insulative jacket 88.

The subject invention would first have to be initially set up for the cable 80 to be worked with the side guide member 36 adjusted with respect to side guide member 34 for cable width, the blades 30 and 44 adjusted for the depth of the cut in the outer jacket, and the blades 54, 56 for the width of the cable. It should also be noted in making the blade adjustments that it is preferable for the blades to penetrate only partially through the outer insulation jacket, as shown in FIG. 5, so as to avoid disturbing and/or damaging the underlying shielding layer 86. In operation, the cable would be passed through the slot 64 to extend between the side guide members 34, 36 and between the blades 30, 44. The upper cutter portion 20 would then be lowered driving the cable against the lower cutter portion 18 and, in guillotine fashion, cutting into the outer jacket 88 of the cable 80 above and below the conductive shield layer 86 with the edge cutting blades 54, 56 notching the end portions of the jacket not reached by blades 30, 44. This operation also brings stops 50, 52 into engagement with portion 62 of cable stripper 22 driving it downward as the cable is cut by the lower cutting blade 30. When the upper cutter portion 20 is raised, this releases the cable stripper 22 to lift the cable off the lower cutting blade 30. The cable 80 will be restrained by slot 64 to be stripped from the upper blade 44 and the edge cutting blades 54, 56. If this operation is performed at or near the end of the cable, the next step would be to withdraw the cable from the transverse cutter assembly 14 and place it adjacent the longitudinal cutter assembly 16. The blade 68 would be brought into contact with the jacket 88 and moved from the transverse cut to the end of the cable, or to a second transverse cut, so that the jacket could be peeled away, as shown in FIG. 6. It should also be noted, that in order to facilitate this peeling away operation it might be advantageous for the operator to utilize a tool, such as a pair of suitably modified pliers (not shown), to get a better grasp on the jacket and peel it away from the remainder of the cable. If it is desired to effect the stripping intermediate the ends of the cable, as shown in FIG. 4, it is only necessary to go through the transverse cutting operation twice in order to prepare the cable.

I claim:

1. An apparatus for cutting only the outer insulating jacket of a multiconductor, shielded, flat cable so as to enable removal of said jacket without damaging the shielding of the cable, said apparatus comprising:

a substantially planar jig means defining a path for a shielded cable;

a first cutter assembly mounted on said jig means transversely of said path for making a transverse cut in said jacket about the entire periphery of said cable, said cut being only part way through the depth of said jacket;

means for stripping said cable from said first cutter assembly after cutting said jacket and comprising a member attached to said jig means for limited relative movement and having a planar portion parallel to and spaced slightly from said first cutter assembly, an elongated slot in said member through which said cable must pass for access to said first cutter assembly, said member restraining said cable from following said first cutter assembly in an opening direction; and a second cutter assembly mounted on said jig means for making a longitudinal cut in said jacket.

2. An apparatus according to claim 1 wherein said jig means comprises:

a planar base; and first and second side guide means secured to said base in parallel spaced relation to define said path, at least one of said side guide means being adjustable.

3. An apparatus according to claim 1 wherein said first cutter assembly comprises:

a first cutter blade adjustably mounted on said jig means to extend transversely of a path for said cable, said first cutter blade being adjusted for depth of cut into said outer jacket;

a second cutter blade adjustably mounted on a means providing relative movement with respect to said first cutter blade, said second cutter blade likewise being adjusted for depth of cut into said outer jacket; and a pair of edge cutter blades mounted on said second cutter blade so as to be spaced apart a distance less than the width of the cable.

4. An apparatus according to claim 3 wherein said first cutter blade, said second cutter blade, and said edge cutter blades are all single bevel blades, the bevels of said edge cutter blades being directed oppositely of said first and said second cutter blades whereby the cutting edges of all of said blades are substantially aligned to make a continuous cut about the periphery of a cable.

5. An apparatus according to claim 1 wherein said second cutter assembly comprises:

a housing mounted for longitudinal movement with respect to said cable path; and a blade adjustably mounted on said housing to cut only part way through the depth of said jacket.

6. An apparatus according to claim 5 further comprising:

a rail means having a pair of spaced end stops, said housing movably mounted on said rail means.

7. An apparatus for cutting the outer insulative jacket of a shielded multi-conductor flat cable without damaging the shielding thereof comprising:

jig means for positioning a shielded cable in said apparatus;

a first cutter assembly for making a transverse cut in said jacket about the entire periphery of said cable, said cut being only part way through the depth of said jacket, said first cutter assembly comprising;

a bottom cutter blade adjustably mounted with respect to said jig means to control the depth of cut into said jacket;

an upper cutter blade moveably mounted on guillotine fashion with respect to said bottom cutter blade, said upper blade being adjustable, to control the depth of cut into said jacket;

a pair of edge cutter blades adjustably mounted on said upper cutter blade spaced so as to be apart a distance slightly less than the width of the cable to be cut; and means to drive said upper cutter blade and said edge cutter blades with respect to said jig means;

means for stripping a cable from said blades comprising a member mounted for limited movement relative to said jig means and having a planar portion parallel to the movement of said upper blade and an elongated slot providing access for said cable to said blades whereby said cable is restrained by said planar portion during opening movement of said blades to be stripped therefrom; and a second cutter assembly for making a longitudinal cut in said jacket.

8. An apparatus according to claim 7 wherein said driving means is a press.

9. An apparatus according to claim 7 further comprising:

means limiting the movement of said upper cutter blade with respect to said bottom cutter blade.

10. An apparatus according to claim 7 wherein said jig means, said first cutter assembly and said second cutter assembly are all mounted on a single base.

* * * * *